April 29, 1941.  P. H. RADER  2,240,078
CLAMP MEANS FOR BALL AND SOCKET TYPE JOINTS
Filed May 15, 1940
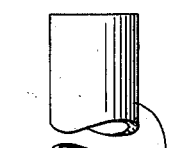
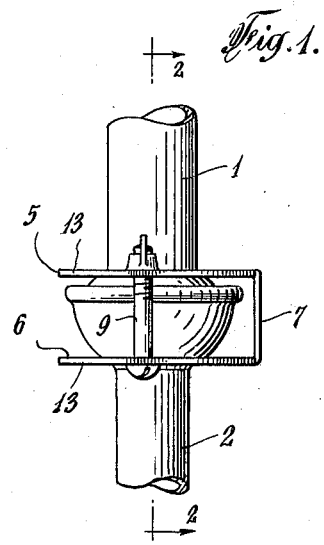
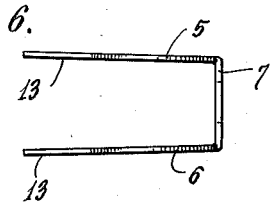
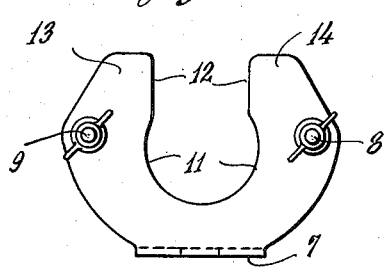
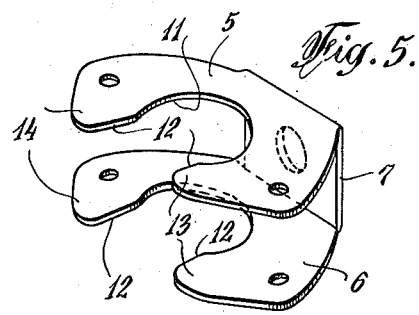
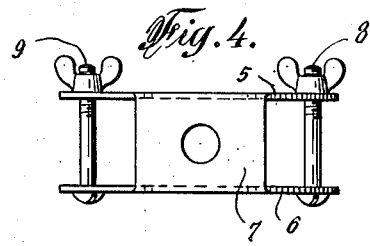
INVENTOR
*Porter H. Rader*
BY
ATTORNEY Patented Apr. 29, 1941

2,240,078

UNITED STATES PATENT OFFICE 2,240,078

CLAMP MEANS FOR BALL AND SOCKET TYPE JOINTS

Porter H. Rader, Bloomfield, N. J., assignor to William O. Geyer, Bloomfield, N. J.

Application May 15, 1940, Serial No. 335,278

2 Claims. (Cl. 285—94)

This invention relates to tubular joints and more particularly to such joints of the ball and socket type and to a clamp means for securing the same together.

Heretofore in the art tubular joints of the ball and socket type have been made and various types of clamp means have been proposed for securing the same together. It is desirable, however, for the clamp means to be light in weight, easily mounted and demounted and include means for applying a sealing spring pressure substantially uniformly circumferentially about the joint.

One of the objects of the present invention is to provide a clamp means for tubular ball and socket type joints which includes these said desirable features. Another object is to provide an improved clamp means for tubular ball and socket joints. Still another object is to provide an improved clamp means for use with tubular glass joints of the ball and socket type. Other objects and advantages will be apparent as the invention is more fully hereinafter disclosed.

In accordance with these objects, I have devised the clamp means for tubular joints of the ball and socket type which is illustrated in the accompanying drawing and which is particularly adapted for use, though not necessarily so limited, with tubular ball and socket joints comprised of glass.

Referring to the drawing, Fig. 1 is a side elevational view of a typical tubular ball and socket joint shown for purposes of illustration, but not of limitation, as comprised of glass with the improved clamp means of the present invention shown in operative position on the said joint; Fig. 2 is a section along plane 2—2 of Fig. 1; Fig. 3 is a top plan view of the clamp means of the present invention; Fig. 4 is a rear side elevational view of the same; Fig. 5 is a perspective view of the same; and Fig. 6 is a side elevational view without details illustrating the free position of the clamp means.

A tubular ball and socket joint comprises two tubular parts 1 and 2 having complementary shaped engaging ball and socket sections 3 and 4 respectively, the tubular parts 1 and 2 opening through said sections 3 and 4 and communicating with each other so as to form a passageway through the joint for gases, vapors and liquids through the joint. Ordinarily, the free ends of the tubular parts 1 and 2 connect with other various types of apparatus. Tubular ball and socket type joints comprised of glass are widely utilized in the chemical apparatus field to interconnect various apparatus elements into a closed system within which various chemical and physical chemical reactions may be performed, such as for example, distilling apparatus.

In such apparatus it is highly essential that the said parts 1 and 2 be held together in hermetic sealed relation over relatively wide differences in pressure between the inside and outside of the joint or apparatus including the joint. I have found that the pressure that is applied to maintain the said parts 1 and 2 must be substantially a spring pressure and must be applied substantially uniformly around the entire circumference of the joint. With glass joints, particularly those to be utilized in joining together chemical apparatus elements, the clamp means also preferably should be relatively light in weight and readily and easily mounted and demounted in clamping position. The clamp means of the present invention fulfills all of these requirements.

The clamp means of the present invention comprises essentially a pair of C-washers 5—6 each comprised of spring stock, joined in edge spring engagement to a back spacing member 7 and provided with means 8—9 on each C-arm to move the two washers towards each other against the spring action of the edge spring engagement to exert a circumferential clamping action on opposite sides of a ball and socket joint enclosed by the clamp. Back spacer member 7 may be provided with means, such as opening 10 therein, to provide for the securing of an extension arm thereto for securing the same to an external support means therefor.

Alternatively, the clamp means of the present invention may be considered a channel member comprised of spring metal provided with a base 7, sides 5 and 6 disposed at a slight outward angle to the plane normal to the surface of the base, with the two said sides provided with concentrically aligned recesses adapted to receive the opposite tubular parts 1 and 2 with the engaging ball and socket parts 3 and 4 positioned therebetween, and means 8—9 on each side of the said aligned recesses to urge the two sides 5 and 6 towards each other to exert a spring opposed clamping action on the outer periphery of the engaging ball and socket parts 3 and 4, the width of the base 7 being selected relative to the thickness of the said parts 3 and 4 to bring the two said sides into substantial parallelism when in full clamping position.

Either description fits the present invention; however, for purposes of more generically describing and claiming the same the first description given is preferred, inasmuch as the idea of providing a clamp means which includes a spring opposed clamping action operating circumferentially on opposite sides of the joint is to the best of my knowledge and belief novel per se and utilized in the specific embodiment herein disclosed.

It is believed obvious that many modifications of the present invention may be made without essential departure from the specific embodiment shown in the drawing. In the chemical apparatus art there are many sizes of glass ball and socket type tubular joints. In general, however, they conform to a standard pattern approximating that indicated in the drawing and different therefrom only with respect to the diameter of the joint and the diameters of tubular parts 1 and 2 secured thereto varying from relatively small diameter to the maximum permissible diameter tube securable through any given diameter joint.

C-washers 5 and 6 therefore for any given diameter joint may be provided with a central opening 11, the diameter of which approximates but is appreciably larger than the largest diameter tube 1 or 2 utilized with the joint, and the width of the space gap between the ends 13—14 of C-washers 5—6 may approximate but be slightly larger than the maximum diameter tube 1 or 2 utilized with the joint.

The edge securing of C-washers 5—6 to back spacer member 7 may be effected in a plurality of ways to obtain the spring action desired therebetween without substantial departure from the present invention. The method illustrated is preferred, however, as it permits the shaping of the clamp means of the present invention by stamping from a single piece of spring sheet material. In forming the clamp means of the present invention it is only necessary to cut the flat sheet to the configuration shown and then to fold the same into the substantially U-shaped structure indicated in perspective view 5 and side view 6, with the outer edges of C-washers 5 and 6 spaced further apart than the width of the spacer member 7.

The precise angle of deflection of C-washers 5 and 6 to the plane surface of the member 7 may be widely varied without departure from the present invention. The width of spacer member 7, however, must closely approximate the maximum height of the joint formed by sections 3 and 4 to provide for the application of the clamping pressure by means 8 and 9 substantially uniformly about the circumference of the joint.

Means 8 and 9 also can be widely varied without substantial departure from the present invention. However, I have found the threaded bolt and adjustable wing nut structure illustrated very satisfactory for the purpose in view.

From the above description and the drawing it is believed apparent that many modifications and adaptations may be made of the present invention and all such departures therefrom are contemplated as may fall within the scope of the following claims.

What I claim is:

1. A clamp means for tubular joints of the ball and socket type comprised of glass, said means comprising a channel member comprised of spring metal, the sides of said channel member being flared outwardly away from a plane normal to the plane surface of the base, aligned recesses in sides each adapted to receive therein the tubular extensions on said joint with the ball and socket parts thereof held in interengagement therebetween, and means on opposite sides of said recess to actuate the two said sides towards each other to exert a spring opposed clamping action on the ball and socket portions of the joint.

2. A clamp means for a tubular joint of the ball and socket type, said clamp means comprising a pair of substantially C-shaped members, said members being provided with entrance openings of reduced width as compared to the center openings therein, the said width approximating the diameter of tubes leading to the said joint, means sustaining said members in spaced relation approximating the length of said joint, and means to move the two said members towards each other to exert a substantially circumferential clamping pressure therebetween on opposite sides of the said joint over a distance in excess of a semi-circle whereby relative angular movement between the joint members is substantially prevented.

PORTER H. RADER.